's Patent Office 3,480,644
Patented Nov. 25, 1969

3,480,644
ALKOXY-3,6-ENDOXOHEXAHYDRO-PHTHALIMIDES
Russell Theodore Nelson, Tacoma, Wash., assignor to Pennsalt Chemicals Corporation, Philadelphia, Pa., a corporation of Pennsylvania
No Drawing. Filed Oct. 17, 1966, Ser. No. 586,977
Int. Cl. C07d *99/04*; A01n *5/00*
U.S. Cl. 260—326        5 Claims

ABSTRACT OF THE DISCLOSURE

Alkoxy - 3,6 - endoxohexahydrophthalimide compounds useful for controlling plant growth.

---

This invention is directed to novel compounds useful as agricultural herbicides. More particularly, the invention is concerned with N-alkoxy-3,6-endoxohexahydrophthalimide compounds and their use for controlling plant growth. The compounds of the invention are characterized by the following chemical structure

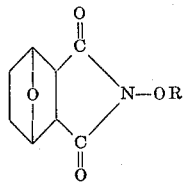

where R is an alkyl radical containing from 1 to 4 carbon atoms.

We have found surprisingly that the compounds of this invention not only possess a high degree of herbicidal activity, but also have high residual activity when applied to the soil for pre-emergent herbicidal use.

The N-alkoxy - 3,6 - endoxohexahydrophthalimides of the invention are readily made by several procedures. One preparatory method is the reaction of the anhydride of 3,6-endoxohexahydrophthalic acid with the appropriate alkoxyamine hydrochloride ($RONH_2$—$HCl$) in the presence of a base such as sodium methylate. This preparation is illustrated in the following example.

EXAMPLE 1

A solution of sodium methylate was made by adding 4.9 grams of metallic sodium to 150 milliliters of cooled, stirred methanol. To this sodium methylate solution there was then added a solution of 16.7 grams of methoxyamine hydrochloride ($CH_3ONH_2 \cdot HCl$) and 140 milliliters of methanol. After filtering the reaction mass to remove sodium chloride, the filtrate was added to a fast stirring slurry of 33.6 grams of the anhydride of 3,6-endoxohexahydrophthalic acid in 100 milliliters of methanol. The addition was made at 22 to 28° C. and the slurry stirred for about 5 hours and then allowed to stand overnight. The reaction mixture was then cooled in an ice bath and the white solid which precipitated was filtered off to give 22.5 grams (57.2% conversion) of white solid N-methoxy-3,6-endoxohexahydrophthalimide melting at 130 to 132° C. Chemical analysis confirmed the above structure.

Other techniques are illustrated by the following examples:

EXAMPLE 2

A solution of 36.6 grams of N-hydroxy-3,6-endoxohexahydropthalimide and 20.2 grams of triethylamine in 200 ml. of dimethylformamide was stirred at room temperature and 31.2 grams of iodoethane was added dropwise. The temperature rose to 37° C. and after stirring two hours and standing overnight, 2.5 grams of the amine iodide was filtered off and the filtrate poured into 500 ml. of ice water. The solid precipitate was filtered off, washed with water and dried to yield 24.5 grams of product N-ethoxy - 3,6 - endoxohexahydrophthalimide. Melting point of product twice recrystallized from 95% ethanol was 152–154° C. Chemical analysis confirmed the identity of the product.

EXAMPLE 3

Following the procedure of Example 2, 0.167 mole of iodopropane was reacted with 0.167 mole of N-hydroxy-3,6-endoxohexahydrophthalimide. The product N-i-propoxy-3,6-endoxohexahydrophthalimide was obtained in 42.7% yield. Melting point of the recrystallized product 130–132° C.

EXAMPLE 4

A solution of 0.20 mole each of triethylamine and N-hydroxy-3,6-endoxohexahydrophthalimide was prepared in 300 ml. of dimethylformamide and then while stirring the solution at room temperature 0.20 mole of 1-iodobutane slowly added. The dark red solution which formed was poured into ice water and the precipitated product recovered as in the above examples. The purified product melted at 114–116° C. and analyzed as follows:

Calculated/found: C, 60.30/60.22; H, 7.10/7.08; N, 5.88/5.84%.

As seen from the above examples the novel compounds of the invention are crystalline solids and melt sharply in pure form. They are of low solubility in water, but soluble in the solvents normally employed for making herbicidal formulation, e.g., aliphatic and cycloaliphatic solvents such as halogenated alkanes (e.g., methylene chloride, ethanol, benzene, xylene, toluene and diacetone alcohol). The compounds are stable to storage, easily handled and afford no difficulty in formulation.

The compounds of this invention are useful for the control of plant growth by contacting plants with a phytotoxic amount of the compounds, and the compounds are of particular value as herbicides, both for pre-emergent and post-emergent herbicidal applications. The compounds of the invention will be used preferably as pre-emergent herbicides, however, for control of weeds and to kill undesired vegetation. The phytotoxic amounts at which the compounds may be used will vary from about 2 to 20 pounds per acre although 4 to 8 pounds per acre will be preferred. Such concentrations can be used to control unwanted growth without damaging or destroying crops. The lower rates can be used to retard weed growth and to impart other plant growth regulation properties. For complete kill, the higher rates will be used. The compounds may be formulated as dispersions in water or as dispersions or solutions in organic solvents. To prepare such dispersions and emulsions a suitable wetting agent may be added which aids in the preparation of the formulation and which also serves to help penetration of the compound into the plant and soil surfaces. Suitable water dispersion concentrates may be prepared with or without suspending agents by ball milling or other fine grinding techniques. Suspending agents will be selected from the various agents readily available, such as lignin sulfonates, bentonite, dilute solutions of Methocel, and the like. Formulations may also be prepared as emulsion concentrates for dilution with water for field applications. These may be prepared by the use of suitable solvents such as xylene, heavy aromatic naphtha, isophorone with the addition of suitable emulsifying agents which are usually blends of various compounds having the proper ratios of oil and water solubility properties and which are stable in the presence of the compound.

As indicated, the compounds are particularly useful in pre-emergent weed control applications on various crops. This method of weed control with a herbicide involves the application of the chemical to the soil some time prior to the emergence of the crop. The application can be conveniently made at the same time as the seeding operation and most commonly involves the use of a sprayer attachment to the planter which applies the diluted chemical on the soil surface immediately after covering the seed. Only a band of the seed row may be treated with the herbicide, or the whole area may be treated on a broadcast basis. The chemical may or may not be mixed with the first one or two inches of soil at the time of this application using a suitable rototiller type tool.

The pre-emergence herbicides as employed in this invention possess the necessary properties to be effective in field use. Ideally, it should be possible to place a chemical on the soil surface in the zone of germinating weed seeds which are usually above the zone in which the crop plant has been placed. The small weed seeds usually emerge from only the upper inch of soil. However, it is impossible under practical conditions to maintain a separation of the chemical and the crop seed and it is therefore necessary for the herbicide to be of a selective type which will control as many undesirable weeds as possible without significant injury to the crop. This requires fairly unique and highly specific properties in the chemical since many of the crop plants are related botanically to seed crops occurring in the same field. The compounds of this invention meet this requirement.

The herbicides of this invention have a wide spectrum of weed control which is desirable because most crops can be infested with many species of both grasses and broadleaved weeds. The pre-emergence herbicide chemicals of this invention are adapted for use on specific crop plants and show a high degree of tolerance to all varieties of the crop. This tolerance is shown on all types of soils and under various environmental conditions which can change the response of a crop to a chemical.

The compositions may also be used in post-emergence applications for weed control where the emerged crop is sufficiently resistant. These applications may be made particularly in the period between emergence and the first cultivation of the crop, but treatments may also be made at later times such as the so-called layby treatment after the last possible cultivation to inhibit weed growth up to the time of harvest.

Certain of these compositions may be used as harvest aid chemicals which will either desiccate or defoliate the green leaves on susceptible crops and also desiccate any weeds which may be present in order to facilitate the mechanical harvesting with a combine in the case of crops or a picker or stripper for such a crop as cotton.

It is also possible to use compositions in higher doses than normally used for the crop application for the purpose of sterilizing the soil of all plant growth. Seasonal control of weeds in areas such as industrial sites and roadsides, etc. may be freed of undesirable vegetation in this manner.

Herbicidal evaluations

The compounds of the invention were evaluated for pre-emergence weed control properties by applying solutions, diluted emulsion concentrates, or wettable powder preparations to the soil surface of flats in the greenhouse. These flats were planted prior to treatment with various crops and with weed seeds. Application of the chemical was made immediately after planting of the crop and weeds. The flats were then placed in the greenhouse and counts made of crop and weed emergence after a three to four week period.

The following examples and other data indicate the results obtained.

EXAMPLE 5

Formulations of various N-alkoxy-3,6-endoxohexahydrophthalimides were prepared and evaluated in the pre-emergent test described above. The following table indicates the compounds evaluated and the results of the tests:

TABLE I.—VARIOUS N-ALKOXY-3,6-ENDOXOHEXAHYDROPHTHALIMIDES EVALUATED AS PRE-EMERGENT HERBICIDES AT 8 POUNDS PER ACRE

| R= | Formulations | Percent Kill | | | Percent Emergence, Sugar beets |
| | | Crabgrass | Amaranthus | Wild oats | |
| --- | --- | --- | --- | --- | --- |
| $CH_3$ | 3% active ingredient; 97% diacetone alcohol. | 95 | 100 | 80 | 80 |
| $C_2H_5$ | 5% active ingredient; 50% diacetone alcohol, 45% water. | 95 | 100 | 80 | 70 |
| $C_4H_9$ | 10% active ingredient; 85% diacetone alcohol; 5% surfactant ("Triton" X-161). | 50 | 50 | 40 | 100 |
| $C_{12}H_{25}$ | 10% active ingedient; 85% xylene; 5% surfactant ("Triton" X-161). | 0 | 0 | 0 | 100 |

As can be seen from the above data, the lower alkyl derivatives have herbicidal effect, but the higher alkyl analogs are without any action on weeds.

EXAMPLE 6

It is known that 3,6-endoxohexahydrophthalic acid derivatives degrade in the soil at normal temperature to form end products that are not biologically active. In order to show the surprising superiority of the compounds of the invention with regard to soil stability the following test was carried out:

Approximately 18 grams of dry soil was placed in petri dishes and 9 milliliters of aqueous solutions containing 40 parts per million concentration of each herbicide was added to each petri dish so that the concentration of herbicide in the wet soil was about 13 p.p.m. by weight. The dishes with their contents were left to incubate at 74 to 80° F. in a moist, dark chamber for 15 days. Distilled water was added to replace water lost from the soil by evaporation and the soil was maintained wet at all times.

At the end of the incubation period the soil was covered with a piece of filter paper which immediately became wet in contact with the wet soil. Onto this filter paper was scattered 30 flax seeds and the petri dish again incubated. One week later observation revealed a good growth of flax sprouts and the following table indicates the degree of growth inhibition of each test compound:

TABLE II

| Agent Tested | Soil Type | Percent Inhibition |
|---|---|---|
| ⬡—COONa, —COONa (with O) | Light sand | 0 |
|  | Dark sand | 0 |
| ⬡ CO\N—OH / CO (with O) | Light sand | 0 |
|  | Dark sand | 0 |
| ⬡ CO\N—OCH₃ / CO (with O) | Light sand | 50 |
|  | Dark sand | 50 |

It is clear from the above table that only the compound of this invention effectively resisted the normal degradation which occurs in moist soil. Thus, it is clear that under the test conditions the compound of the invention was not as quickly destroyed, but remained in the soil and remained effective as a herbicide.

EXAMPLE 7

A formulation was prepared as follows.

Ingredient: Percent by wt.
N-methoxy-3,6-endoxohexahydrophthalimide __ 10
Xylene _____ 65
Dimethylsulfoxide _____ 20
Surfactant ("Triton" X-155) _____ 5

When the above formulation was sprayed on cotton plants at 5 lb./acre, 100% defoliation of the cotton plants was observed in seven days.

At 1.0 lbs./acre on beans, 100% defoliation was observed in 7 days and at 10 lbs./acre, 100% kill of the bean plants occurred in 14 days.

I claim:
1. A compound of the formula

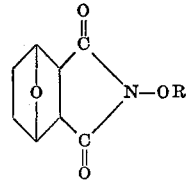

where R is an alkyl group containing from one to four carbon atoms.
2. N-methoxy-3,6-endoxohexahydrophthalimide.
3. N-ethoxy-3,6-endoxohexahydrophthalimide.
4. N-propoxy-3,6-endoxohexahydrophthalimide.
5. N-butoxy-3,6-endoxohexahydrophthalimide.

References Cited
UNITED STATES PATENTS
3,122,560   2/1964   Rigterink _____ 260—325

ALEX MAZEL, Primary Examiner
S. A. NARCAVAGE, Assistant Examiner

U.S. Cl. X.R.
71—95